C. H. SCHOL.
MANUFACTURING SLAG PRODUCTS.
APPLICATION FILED APR. 28, 1913.
1,076,657.
Patented Oct. 21, 1913.
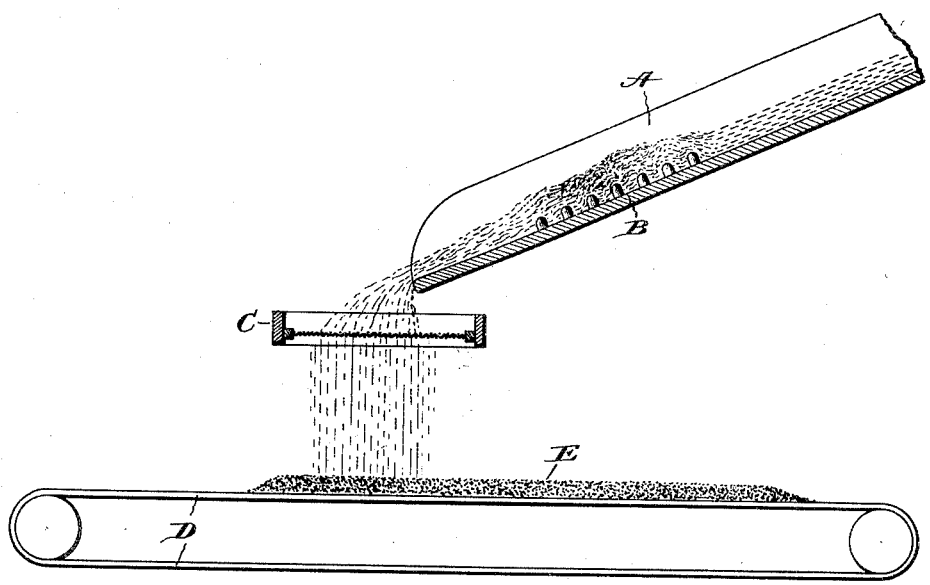
Witnesses:
Jas E Hutchinson
H. N. Ramsey
Inventor:
By C. H. Schol,
Arthur L. Lean, Attorney.

UNITED STATES PATENT OFFICE.

CARL HEINRICH SCHOL, OF ALLENDORF, GERMANY.

MANUFACTURING SLAG PRODUCTS.

1,076,657.     Specification of Letters Patent.     Patented Oct. 21, 1913.

Application filed April 28, 1913. Serial No. 764,210.

*To all whom it may concern:*

Be it known that I, CARL HEINRICH SCHOL, a subject of the German Emperor, residing at Allendorf, Dillkreis, Germany, have invented certain new and useful Improvements in the Process of Manufacturing Slag Products, of which the following is a specification.

The present invention consists in improvements in the process of manufacture of light slabs, bricks, etc., from blast furnace slag, specified in the specification of my patent application Ser. No. 664012 filed December 4, 1911.

According to the aforesaid application Serial No. 664012 the granulation of the slag is effected by the simultaneous action of water and compressed air thereon for the purpose of obtaining as high a proportion as possible of porous bulky lumps. I have now found that that process is more particularly adapted for treating acid or "long" slag whereas it is not so suitable for treating basic or "short" slag.

A principal object of the present invention is to enable basic or "short" slag to be converted by granulation into a foamy porous mass.

The accompanying drawing shows diagrammatically one form of apparatus adapted for carrying my process into practice.

In the drawing, A designates a trough or channel provided with an uneven or roughened surface B. Arranged at and beneath the discharge end of the channel or trough A is a sieve C, and below the sieve C is an endless conveyer D upon which is arranged a layer of moist sand E, a portion of the conveyer extending directly beneath the screen C.

According to the present invention, the basic slag while in a molten state receives an addition of crushed or ground natural pumice, quartz or similar substances containing silicic acid. These additions not only alter the chemical composition of the slag but have also the property of increasing the porosity of the slag. The effect of these additions is to render the slag foamy so that when it is introduced into or subjected to the action of water, it is converted into bulky porous lumps.

It is to be noted that the addition of natural pumice, quartz or similarly acting substances containing silicic acid is of course also advantageous in cases where the disintegration and granulation of the slag are effected by means other than water and compressed air, for instance by a mechanical operation. It has been found that lumps of too large a size are sometimes formed in this operation which cannot be well used for the manufacture of light slabs, blocks, etc. To avoid that draw-back, the slag instead of being allowed to flow in a solid or continuous stream into the water or other medium is previously broken up or subdivided in any suitable way, for instance, by causing the same to flow over a sieve-like perforated surface, the slag being thus caused to flow in thin fine streams into the water or other medium.

In adding natural pumice, quartz, etc., it has been found that the action of the silicic acid alone is probably not the main cause of the effect produced by these additions. Natural pumice contains besides a great deal of silicic acid, also a certain percentage of alumina, which is probably the cause of the new effect that is produced. Special experiments have shown that the addition of the alumina has a very favorable effect upon the tenacity and strength of the slag articles because on increasing the addition of alumina in the mixture the foamy slag gives a much more stable product than is obtained by an addition of pure quartz sand although the latter mixture is also very foamy and yields a good product.

The present invention therefore also consists in rendering blast furnace slag foamy by mixing substances containing silicic acid and alumina with the molten slag. For this purpose a suitable and readily sintering and easily fusible clay may be used. The blast furnace slag can then be rendered foamy without a special granulation by water and compressed air or compressed gas.

This process may be carried out by adding the desired addition substances, for instance readily sintering clay or the like or other substances containing large quantities of silicic acid and alumina, to the molten slag and conveying the mixture preferably over a channel having an uneven bottom so that the mixture can flow along the same in the form of rapids or in cascades. By this means the slag and the additions are thoroughly mixed together, thus preventing any lighter particles from floating on top and the heavier ones from collecting on the bottom of the channel.

This process may also be carried out by first heating the additional substances to their melting point and then adding them in this form to the slag. This process is suitable when the slag itself has not a very high temperature and is therefore unable to melt the required quantity of added substances.

In cases where the desired quality of the manufactured iron permits, this process may be carried out by adding the desired additions to the ordinary furnace charge, so that the slag flowing from the furnace will have the same composition and mixture as it would otherwise acquire if the desired additions were added to the molten slag after it has left the furnace. It is therefore to be understood that in carrying out the present invention it is immaterial when and at what moment and in what form the additions are added to the slag in order to open it and render it foamy or porous.

The present invention consists further in an improvement in the process specified in my application Serial No. 664,012, for exposing the slag to the simultaneous action of water and compressed air whereby the slag is subjected to the action of steam generated by the contact of the molten slag with the water. Now according to my present invention the slag is caused to generate also the compressed air required for its granulation. In carrying out this part of the present invention highly porous sand or similar material capable of absorbing a very large quantity of water and which also contains a large quantity of air in its interstices is well saturated with water and made up into a large and preferably somewhat sloping bed over which the molten slag is caused to flow. By this means the water contained in the interstices of the bed is converted immediately into steam, and also the contained air is heated and thereby caused to expand to a considerable degree so as to generate compressed air.

The steam and compressed air have a tendency to rise up through the molten slag and to penetrate it in such a manner as to cause it to swell while cooling it at the same time. The slag thus encounters ascending compressed air by which it is loosened in a high degree. On cooling the highly porous slag spread out on the bed of sand or the like consists of large and small lumps which can then be reduced by any suitable known means to the size of grain which is required for the manufacture of light slabs, blocks, &c. according to the present invention. This part of the present invention may be carried out in a very great variety of ways. For instance the wet sand or the like instead of being made up into a bed, may be spread on a conveyer band and thus be carried past the slag-discharging channel or spout. By this means the molten slag spread over the layer of wet sand or the like is caused to swell and become loose and is cooled in the same manner as hereinbefore described, with however the advantage that the treated slag is conveyed to the place of further treatment.

As stated hereinbefore, the material produced according to the present invention may be used for the manufacture of all kinds of articles, for instance building blocks, bricks, plates, slabs, boards, and as a non-conductor of heat, cold, and sound, and also as a light filling material in the construction of solid ceilings and the like; in a word, for all building purposes where very great load-carrying capacity and very great compressive strength are not required.

What I claim is:

1. The process of converting blast furnace slag into a foamy porous mass, which consists in adding to the slag while the same is in a molten state natural pumice.

2. The process of converting blast furnace slag into a foamy porous mass which consists in adding to the slag while the same is in a molten state material containing silicic acid and alumina.

3. The process of converting blast furnace slag into a foamy porous mass which consists in adding to the slag while the same is in a molten state, material in granular form containing silicic acid and alumina.

4. The process of converting blast furnace slag into a foamy porous mass which consists in mixing with the slag while the same is in a molten state material containing silicic acid and alumina, and subjecting the mixture to the action of water.

5. The process of converting blast furnace slag into a foamy porous mass, which consists in mixing with the slag while the same is in a molten state, material containing silicic acid and alumina, causing the mixture to flow in fine streams and subjecting the same to the action of water.

6. The process for producing a foamy porous blast furnace slag, which consists in adding material containing silicic acid and alumina to the ordinary charge of the blast furnace.

7. The process of converting blast furnace slag into a foamy porous mass which consists in adding to the slag while the same is in a molten condition material containing silicic acid and alumina, and causing the same to flow over an uneven surface to thoroughly mix the added materials with the slag.

8. The process of converting blast furnace slag into a foamy porous mass which consists in adding to the slag while the same is in a molten condition material containing silicic acid and alumina, causing the same to flow over an uneven surface to thoroughly mix the added materials with the slag, and subjecting the mixture to the action of water.

9. The process of treating furnace slag consisting in mixing with the slag while the same is in a molten condition material containing silicic acid and alumina, and causing the mixture to flow over a bed of moist sand.

10. The process of treating furnace slag consisting in mixing with the slag while the same is in a molten condition material containing silicic acid and alumina, and causing the mixture to flow over a traveling bed of moist sand.

In testimony whereof I have signed my name to this specification in the presence of two subscribing witnesses.

CARL HEINRICH SCHOL.

Witnesses:
JEAN GRUND,
CARL GRUND.